UNITED STATES PATENT OFFICE.

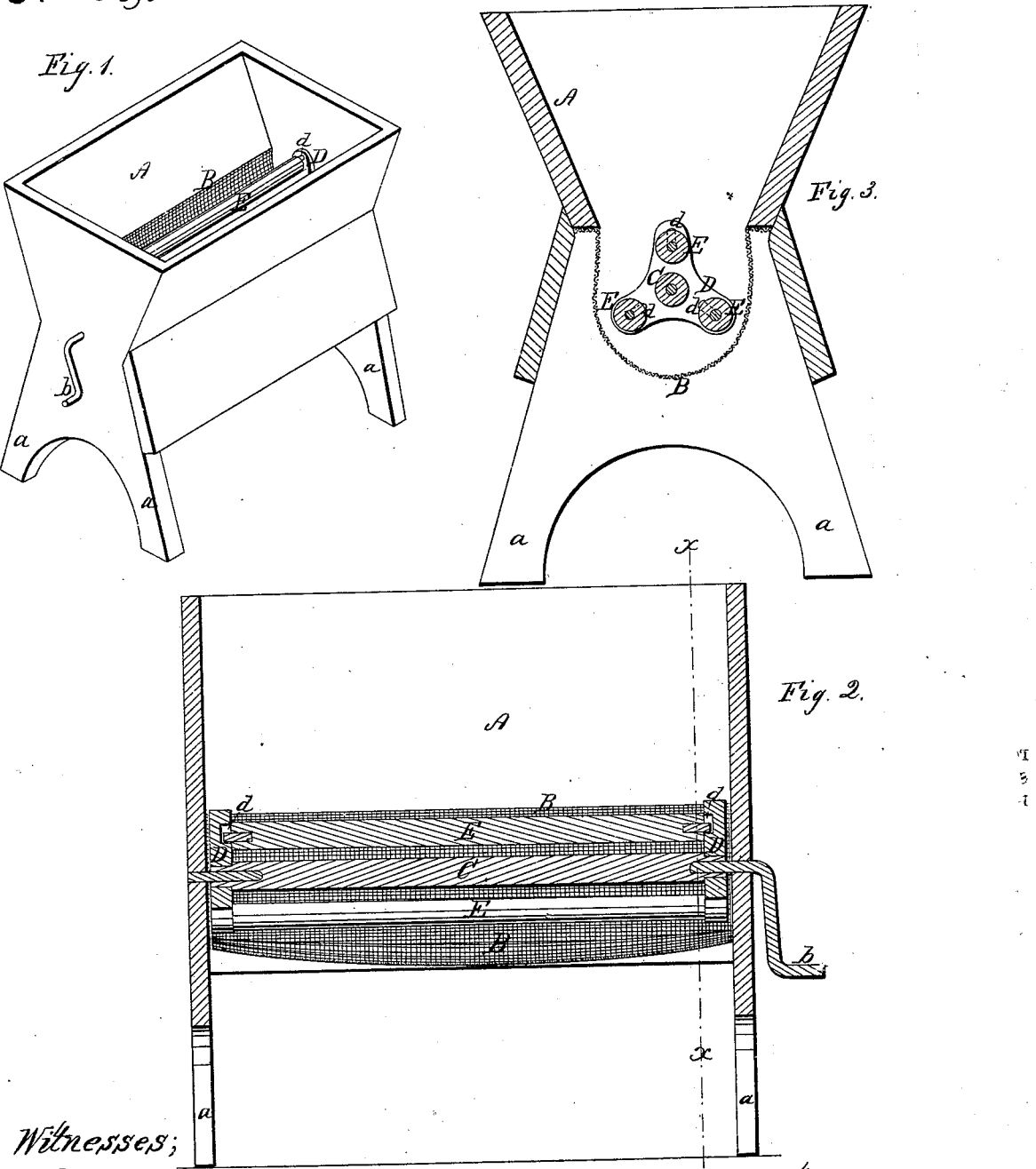

HENRY L. MESERVEY, OF BOSTON, MASSACHUSETTS, ASSIGNOR, BY MESNE ASSIGNMENTS, TO HOWARD TILDEN.

FLOUR-SIFTER.

Specification forming part of Letters Patent No. 51,657, dated December 19, 1865.

*To all whom it may concern:*

Be it known that I, HENRY L. MESERVEY, of Boston, in the county of Suffolk and State of Massachusetts, have invented an Improved Flour-Sifter, of which the following is a full, clear, and exact description, reference being had to the accompanying drawings, making a part of this specification, in which—

Figure 1 is a perspective view of my improved sifter. Fig. 2 is a central longitudinal section through the same. Fig. 3 is a transverse section through the same on the line $xx$ of Fig. 2.

My invention has for its object to produce an effective sifter of simple construction, which can be furnished at a low cost; and it consists in a box or hopper provided with a sieve and containing a revolving frame carrying a series of rolls, by which arrangement the operation of sifting is performed in a rapid and effectual manner.

To enable others skilled in the art to understand and use my invention, I will proceed to describe the manner in which I have carried it out.

In the said drawings, A is a box or hopper, of the form seen in Fig. 1, which is supported on the legs $a$, and has attached to its lower end a sieve, B, of a curved form, as seen in Fig. 3.

C is a shaft, which has its bearings in the ends of the box A, and is revolved by means of a handle, $b$. This shaft carries at each end a triangular piece or frame, D, of the form seen in Fig. 3, between which and parallel to the shaft C are supported the rollers E, the journals of which rest in slots $d$ in the pieces D, so as to allow the rolls to yield toward the center, and thus prevent them from being obstructed by or crushing any hard substance or impurity in the flour or other article being sifted.

If preferred, suitable springs may be introduced into the slots $d$, so as to keep the rolls constantly pressed outward from the center, and allow of their yielding on coming into contact with any obstruction in the article being sifted.

The operation of this sifter is as follows: The flour or other article to be sifted is placed in the box A and the handle $b$ turned so as to revolve the frame and rollers E, which agitate the flour in its descent, breaking up the lumps and rubbing it across the sieve, causing the finer particles to pass rapidly through.

A sifter constructed as above described is always clean and pure, no leather, rubber, or other article likely to impart a bad taste being employed in the interior, and performs its work in a thorough and expeditious manner.

I am aware that a quadrilateral shaft having strips of rubber projecting from its angles has been used in connection with a box and sieve; but my invention differs from this, as my rolls are permitted to yield radially, and also turn on their axes to enable them the more easily to pass over any hard substance without dragging it over the surface of the sieve.

What I claim as my invention, and desire to secure by Letters Patent, is—

A revolving frame carrying a series of rollers, E, in combination with a box or hopper, A, and sieve B, substantially as and for the purpose set forth.

HENRY L. MESERVEY.

Witnesses:
P. E. TESCHEMACHER,
N. W. STEARNS.